UNITED STATES PATENT OFFICE.

ALEXANDER IMSCHENETZKY, OF ST. PETERSBURG, RUSSIA.

REFRACTORY MATERIAL.

SPECIFICATION forming part of Letters Patent No. 631,719, dated August 22, 1899.

Application filed September 17, 1898. Serial No. 691,223. (No specimens.)

*To all whom it may concern:*

Be it known that I, ALEXANDER IMSCHENETZKY, a subject of the Emperor of Russia, and a resident of St. Petersburg, Russia, have invented certain new and useful Improvements in the Manufacture of Refractory Material, of which the following is a specification.

This invention relates to an improved manufacture of a refractory material suitable for building purposes, consisting of asbestos, with or without admixture of other material, bound together by means of silica. It has heretofore been proposed to manufacture such refractory material by first producing a cohering mass of asbestos, with or without addition of other materials, such as chalk and the like, and then soaking such mass in a solution of sodium silicate having an admixture of sulfuric or other suitable acid sufficiently dilute to insure that the silica solution resulting from the reaction of these substances shall not gelatinize or assume the colloidal form until it has penetrated effectually into the interstices of the mass. This method of manufacture is subject to several disadvantages. On the one hand, owing to the necessity of employing a weak acid solution in order to delay the formation of colloid silica, only a small proportion of the sodium silicate in the solution that penetrates as such into the mass is converted into colloid silica, a great part of the silicate of the solution remaining unchanged, and consequently being liable to be dissolved out of the mass again on its being subjected to the action of water or acid. It is therefore not possible to treat the mass after the above-described saturation with a solution of acid alone for the purpose of transforming the remaining silicate into colloidal silica because the acid forms besides, with the sodium silicate, other salts of soda and would also injure the asbestos. In consequence of the above disadvantages the product obtained contains only a small proportion of colloidal silica and is consequently of small strength and of a brittle nature, and it will not sufficiently withstand heat or moisture on account of the unaltered silicate that it contains. These various disadvantages are entirely obviated by my present invention, whereby a large proportion of colloidal silica can be introduced into the asbestos mass by means of reagents which have no chemical action upon the substances mixed with the asbestos, while at the same time the by-products of the reaction by which the silica is liberated can be recovered in a form suitable for further use.

The invention consists, mainly, in acting upon the asbestos mass with a solution composed of a mixture of an alkali silicate, preferably sodium silicate, with sodium bicarbonate. By the reaction of these substances colloidal silica is slowly formed as the solution penetrates into the asbestos mass, which will eventually contain a quantity of colloidal silica, together with a quantity of unconverted silicate, the formed silica being sufficient to afford the asbestos mass a degree of strength that will allow of its being handled without fracture. The asbestos mass so treated is then immersed in a bath of sodium bicarbonate alone, which in penetrating into the mass combines with the silicate therein and deposits all the silica that it contains, thus greatly strengthening the mass. If necessary, the asbestos mass so treated may either be again treated with a mixture of sodium silicate and sodium bicarbonate, or after the initial saturation the mass may be treated first with a silicate solution only and then with a bicarbonate solution only, and this operation can be repeated until it is found that the asbestos mass will take up no more solution.

Although in the above-described process I prefer to begin with a solution of a mixture of silicate and bicarbonate, yet the process can also be carried out by using for the initial solution a mixture of silicate and sulfuric or hydrochloric acid for the production of a certain amount of silica in the mass, as in the known process, while the subsequent processes are carried out as above described by the use, first, of a bicarbonate solution for reacting on the unconverted silicate in the mass and then treating it either with a mixture of silicate and bicarbonate or with silicate first and then with bicarbonate.

In practically carrying out my above-described invention I proceed as follows: The asbestos fibers are first separated from each other by any known means, and if it be desired to add other materials to the asbestos this is then mixed with the carbonates or oxides of calcium, magnesium, iron, or the like for the purpose of cheapening the product or of reducing its specific gravity or of modifying its color, and the mass is then kneaded with water to obtain a paste capable of being formed into sheets, either manually or mechanically, like paper-pulp, or into objects of any desired form, which are dried and cemented with a solution of silica by the preliminary treatment above described. When such preliminary silica solution is prepared from sodium silicate and sodium bicarbonate according to the present invention, a proportion of one volume of sodium-bicarbonate solution of 5° Baumé to two volumes of sodium-silicate solution of 15° Baumé may be used for the mixture. This will give a solution that does not assume the colloidal form too rapidly and that consequently enables the mass to be thoroughly permeated by the solution before the colloid is formed. After the preliminary treatment the objects are pressed to give them a regular shape, which shall not alter during the subsequent operations, and are again dried. They are now, according to one method of proceeding, impregnated with a strong solution of sodium silicate, $Na_2O(SiO_2)n$, (of a specific gravity from 30° to 36° Baumé,) and once more dried. The objects are next soaked during twenty-four hours or longer, according to their thickness, in a saturated solution of sodium bicarbonate ($NaHCO_3$) or potassium bicarbonate ($KHCO_3$) or ammonium bicarbonate ($NH_4HCO_3$).

As it is evident that for reasons of cheapness and on other grounds sodium would be chosen in the process in preference to potassium or ammonium, I shall throughout the rest of the specification describe the process with reference to sodium. It will be obvious that the other alkalies could be used, if desirable.

The unconverted sodium silicate still remaining in the pores of the material from the preliminary treatment, as also any silicate subsequently introduced, is gradually decomposed by the bicarbonate solution in accordance with the chemical equation:

$$Na_2O(SiO_2)n + 2NaHCO_3 = (SiO_2)n + 2Na_2CO_3 + H_2O.$$

The silica remains in the pores and the resulting sodium carbonate passes into the bath, so that the sodium-bicarbonate bath originally employed becomes converted into sodium carbonate.

According to the second mode of proceeding the material after being subjected to the preliminary treatment with an alkaline solution holding free silica in suspension is at once immersed in a bath of sodium bicarbonate instead of being first treated with sodium silicate.

The improvements achieved by the introduction of sodium bicarbonate into the manufacture of the refractory material are as follows:

First. The reaction between sodium bicarbonate and the sodium silicate allows of the use of strong solutions of sodium silicate and therefore of the deposition of larger quantities of silica in the pores of the mass than is the case when comparatively weak solutions of sodium silicate are used. The solidity of the product is thus increased, and the material can be readily handled at all periods of the process without injury thereto.

Second. Sodium bicarbonate has no chemical action on the constituents of the mass, and therefore no influence on its constitution. This is not the case when acid is used.

Third. Sodium bicarbonate does not evolve any gas which would inflate the objects and disintegrate them.

Fourth. From what is said under "second" it follows that all the sodium bicarbonate is used productively, since it is only used up in reacting with the sodium silicate, (which is not the case if acids are used which form salts of soda instead of colloid silica and also react with the admixture in the mass.) Consequently there are no waste products in the manufacture when this is entirely carried out with sodium silicate and sodium bicarbonate and without acid.

Fifth. When sodium bicarbonate is used the reaction which determines the liberation of the silica produces at the same time sodium carbonate as a by-product, and from this sodium bicarbonate can be regenerated by treatment with carbon dioxid after the asbestos material has been removed from the bath, thus the by-product can be used again in the manufacture, and consequently there is practically no waste product. When acids are used, the by-product is a solution of sodium sulfate or sodium chlorid, which is of no further value in the process.

Sixth. When the silicate is treated with sulfuric or hydrochloric acid, (which is necessarily used in excess,) a mixture of acid indispensable for the reaction and a salt quite useless in the reaction are formed in the solution. Thus the proportion of acid contained in the solution cannot be determined by a hydrometer, and the determination becomes too complicated for a large scale of manufacture. Besides when such a solution becomes too rich in salt it must be discarded in spite of its contents of acid, for the cost of separation is too great. On the contrary, when the sodium silicate is treated with sodium bicarbonate the resulting sodium-carbonate product does no harm in the solution.

As before stated, the treatment of the objects with the silicate and bicarbonate can be repeated, if it be desired to impart to the manufactured articles a greater degree of strength, such as may be required for the particular purpose to which it is to be applied. The drying after impregnation with sodium silicate can be dispensed with, and the objects can be directly immersed in the sodium bicarbonate, but in this case the action is slower. In the first treatment the silicate may also be applied first and the steeping in bicarbonate follow in the same way as hereinabove described with reference to the later stages of the process.

After cementing the objects made of refractory material may be coated with a layer of mineral pigment capable of resisting the action of water and high temperature.

The color can be spread on plain surfaces—for example, on sheets of the refractory material—by means of machines such as are used in the manufacture of oil-cloth. The color may be prepared as follows: The dry pigment is mixed with the silicate and spread on the surface of the refractory material, which is then dried and treated with a solution of calcium chlorid or magnesium chlorid. There is then produced on the surfaces prepared in this way a silicated color which adheres very firmly to the surface of the refractory material and is attacked neither by water nor by high temperature, (300° to 400° centigrade.)

The refractory material produced according to the above-described invention differs essentially from all existing products of a similar nature in that it possesses the following valuable properties: Being composed of asbestos cemented together by a comparatively large quantity of pure silica, only produced in the colloidal form, the material is very strong, fireproof, acid proof, and frostproof. It does not shrink or swell or warp and can be boiled for hours in water without being affected thereby. The material can be produced in sheets of a pliable nature and of great strength. Such sheets can vary in thickness from that of thin paper to several inches and are capable of being made of a size of six feet square or even larger. The material may also be pressed in molds to assume any desired shape. It may also be used in the form of plaster, adhering firmly to any kind of surface. Furthermore, owing to the possibility of adding large quantities of chalk or other carbonates or oxids of the metals up to, say, two-thirds of these materials to one-third of asbestos, a comparatively cheap material can be produced which still possesses in a greater or less degree the above-enumerated properties.

What I claim as my invention is—

1. The process of manufacturing refractory material, which consists in first saturating articles made of asbestos with an alkaline solution holding free silica in suspension, and then treating the same with a bicarbonate solution in order to deposit the silica from the unconverted silicate contained therein, substantially as and for the purposes described.

2. The process of manufacturing refractory material, which consists in first saturating articles made of asbestos, with a solution of sodium silicate mixed with sodium bicarbonate and then further treating the same with a bicarbonate solution, substantially as and for the purposes described.

3. The process of manufacturing refractory material, which consists in first saturating articles of asbestos with a solution of sodium silicate mixed with sodium bicarbonate, then saturating the same first with a sodium-silicate solution, and then with a sodium-bicarbonate solution, substantially as described.

4. The process of manufacturing refractory material, which consists in first soaking sheets or other forms produced from asbestos-pulp in an alkaline solution holding free silica in suspension, then drying the same, then impregnating the same with a solution of sodium silicate, and lastly, treating the same with a solution of an alkaline bicarbonate, substantially as described.

5. The process of manufacturing refractory material, which consists in first treating a solution of sodium silicate with a bicarbonate solution sufficiently weak to insure a slow formation of colloidal silica, then saturating bodies made of asbestos with such mixed solutions, and lastly, treating said bodies with a bicarbonate solution, substantially as described.

In witness whereof I have hereunto set my hand in presence of two witnesses.

ALEXANDER IMSCHENETZKY.

Witnesses:
N. TSCHENALOFF,
J. BLAIR.